United States Patent
Pomella et al.

[15] 3,703,327
[45] Nov. 21, 1972

[54] NUMERICAL CONTROL DEVICES

[72] Inventors: Piero Pomella, Piazza Balla, 14; Luciano Lauro, Stradale Turin, 411, both of Ivrea, Italy

[22] Filed: Aug. 10, 1971

[21] Appl. No.: 170,491

Related U.S. Application Data

[63] Continuation-in-part of Ser. No. 47,388, June 18, 1970, abandoned.

[30] Foreign Application Priority Data

June 21, 1969 Italy..................52341 A/69

[52] U.S. Cl. ..............318/571, 318/573, 235/151.11
[51] Int. Cl. ..........................................G05b 19/24
[58] Field of Search ..318/571, 573; 235/183, 151.11

[56] References Cited

UNITED STATES PATENTS

| | | | |
|---|---|---|---|
| 3,109,092 | 10/1963 | Lott et al. .............318/573 X |
| 3,518,513 | 6/1970 | Pomella et al. ........318/573 X |
| 3,555,253 | 1/1971 | Seki.......................318/573 X |
| 3,621,216 | 11/1971 | Wortzman .............318/573 X |
| 3,634,667 | 1/1972 | Okamoto...............318/573 X |

Primary Examiner—Benjamin Dobeck
Attorney—Harold J. Birch et al.

[57] ABSTRACT

A numerical control device for positioning a movable member includes an interpolation unit which effects numerical control by circular interpolation, approximating the arc of a circle by a series of straight line segments. Referred to the origin of the circle, the incremental displacement components required to move $y_i/K$ along the x-axis and $x_i/K$ along the y-axis, where K is a predetermined factor. The interpolation unit operates in a succession of phases corresponding to said segments and includes means to divide said coordinates ($x_i$, $y_i$) by K, and means for summing said resultants to form summations ($\Sigma x_i/K$, $\Sigma x_i/K$). The error in approximating to said arc is maintained below a predetermined maximum by starting a new interpolation phase whenever $\Sigma x_i/K$ or $\Sigma y_i/K$ reaches a predetermined value. The interpolation unit also includes means for summing the components $\Delta x_i$, $\Delta y_i$ of the path segments corresponding to successive interpolation phases. To limit the speed of the member, the interpolation unit sums the incremental displacement components ($x_i/K$, $y_i/K$) over a time cycle comprising several interpolation phases. The interpolation is stopped if the summation of either of the displacement components reaches a predetermined value corresponding to a maximum velocity component.

18 Claims, 7 Drawing Figures

NUMERICAL CONTROL DEVICES

CROSS-REFERENCE TO RELATED APPLICATION

This application is a continuation-in-part of our application Ser. No. 47,388 filed June 18, 1970 now abandoned.

BACKGROUND OF THE INVENTION

This invention relates to a numerical control device for positioning of a movable member, e.g., part of a machine tool such as the headstock, or a worktable. The device comprises an interpolating unit and effects numerical control of the continuous type using a so-called "circular" interpolation, so as to control the displacements of the movable member along a path represented by any continuous line desired, approximated by arcs of a circle.

Devices for continuous numerical control of the positioning of a movable member are already known; one of these devices is described in U.S. Pat. No. 3,518,513 assigned to the Assignee of the present application.

The device described in the aforementioned patent provides for continuous numerical control of a movable member along one or more axes, is fed by a program member which supplies discontinuous position orders, and comprises an interpolating unit adapted to compute and store position increments during subsequent interpolating cycles.

The device described in the patent mentioned above operates as a computer, being fed with discrete geometric data, as well as other data such as maximum permitted speeds, recorded, for instance, on a punched paper tape, and this computer is able to supply, in a substantially continuous way, the commands for positioning along all the intermediate points pertaining to the path segment which connects the discrete points supplied by the program. The data supplied by the interpolating unit will cause these intermediate points, comprised between the successive pairs of discrete points of the program, to fall on the straight line segment connecting each pair of discrete points, that is to say that the interpolating unit is capable of effecting a so-called "linear" interpolation by means of which the theoretical path passing through the discrete points of the program is approximated by an actual path formed by a broken line composed by a plurality of straight segments.

The device described above, although providing for control of the movement of the movable member of a machine tool along one or more axes, so as to allow the performance of even highly complex machining operation and requiring only a very simple programming (in fact, it is necessary to program solely the coordinates of the discrete points of the path desired and the value of the maximum feed speed allowed along the displacement axes, for each of the segments comprised between the various pairs of discrete points), is however subject to the drawback arising from the fact that the path actually followed by the movable member is, in some instances, an unacceptable approximation to the theoretical path, or that, in order to approach this theoretical path, rather tedious programming is required, it being necessary to fix a high number of discrete points to approach the theoretical path by means of straight segments, with a higher degree of accuracy. The time required by the machine for carrying out such program is then long, resulting in a very long overall time for machining the workpiece.

Devices for continuous numerical control of the positioning of a movable member are also known which are adapted to cause the member to move along a path formed by a broken line, whose straight segments together approach a predetermined geometrical curve, the latter being identified by means of the coordinates of some of its points, recorded on a program member of the device. Among these devices, the most widely known are those effecting the so-called circular and parabolic interpolations. Depending on whether the said broken line, forming the path of the movable member, is obtained by interpolation of a circle or parabola, the interpolating devices are adapted to effect a circular or parabolic interpolation, respectively.

The known devices for effecting circular interpolation can be subdivided essentially into two classes.

In a device of a first class, the movable member is displaced by a sequence of straight increments of position, each of which is computed during one interpolation cycle and is equal to the length of one segment of the broken line approaching the arc of circle to be interpolated. Each segment of this broken line is parallel to the tangent drawn to the aforementioned circle at the point where the radius, connecting the center of the circle with the starting point for the interpolation cycle, intersects the same circle. The angular increment, to pass from one vertex of this broken line to the next one, is constant and, therefore, each segment of the broken line will form a constant angle with the adjacent ones.

However, this class of device suffers from some drawbacks. First of all, the error incurred in the various cycles of interpolation is different and increases as the interpolation proceeds. Further, when curves constituted by arcs of circles of different radii must be interpolated, it is necessary to vary the angular increment to pass from one vertex of the broken line to the next, in order that the errors incurred in the various cycles of interpolation shall be not much different from one another.

In a device of the second class mentioned above, in each interpolation cycle the final point of each increment of position (corresponding to a segment of the broken line approaching the arc of circle) is determined by a rather complex geometric construction. This construction consists first in determining, on the tangent to the circle passing through a point from which the interpolation originates, a segment of predetermined length, which defines a first right-angled triangle having a vertex at the center of the circle; second, by defining a second right-angled triangle having a vertex coincident with the center of the circle and the right-angled vertex lying in the middle point of said predetermined segment. The final point to be obtained through the interpolation is found by parallelly translating that side of said second right-angled triangle which does not contain the center of the circle to form a straight line passing through the point from which the interpolation starts. Such a device operates with a succession of complex operations, and is therefore rather complicated.

An Object of the present invention is to avoid the disadvantages enumerated above.

SUMMARY OF THE INVENTION

The numerical control device of this invention for positioning in a continuous manner the movable member of a machine tool or the like which is movable at least along two axes ($x$, $y$), receives from a program unit discontinuous position orders which identify arcs of a circle belonging to the path to be followed. An interpolating unit is fed by the program unit and operates through a succession of interpolating phases, each of which is used to compute a path segment which is a tangent to one of said arcs. The interpolating unit comprises means for dividing by a predetermined factor K each coordinate ($x_i$, $y_i$) of the point from which each interpolation phase originates so as to obtain ratios $x_i/K$, $y_i/K$ which represent components along the axes $y$ and $x$ respectively of increments of displacement along each of said path segments, and means for effecting, during each interpolation phase, the calculation of the summations of said components of the displacement increments, $\Sigma(x_i/K)$, $\Sigma(y_i/K)$, these two summations comprising the same number of terms and representing the components $\Delta x_i$, $\Delta y_i$, along the axes $x$, $y$, of each of said path segments, according to the relations:

$$\Delta x_i = \Sigma(y_i/K)$$

$$\Delta y_i = \Sigma(x_i/K)$$

The interpolating unit also includes means for carrying out the sum of the components $\Delta x_i$, $\Delta y_i$ relative to the various interpolation phases.

BRIEF DESCRIPTION OF THE DRAWINGS

For a better understanding of the present invention there will now be given, by way of example, the description of a preferred embodiment thereof, with reference to the drawings, in which.

DESCRIPTION OF THE PREFERRED EMBODIMENT

The device to be described can control, in a continuous manner, the positioning of the movable member of a machine tool (for instance the headstock or the worktable) or another movable member, by means of a servo-system provided on each axis, adapted for positioning the movable member under the control of position orders recorded on a program member and supplied to the device in a discontinuous manner.

In the following description, reference will be made to a machine tool whose movable member is displaceable along two or more axes, but for simplicity it will be assumed in the detailed description that the movable member can be displaced along two axes, namely the $x$ and $y$ axes. Thus the movable member must undergo displacements along a continuous path lying in the $x$, $y$ plane (FIG. 1) and formed by a line comprising arcs of circles of different radius, one of which, $C_1$, is shown in FIG. 1 and has starting and finishing points $P_1$ and $P'_s$ respectively and a center O, coinciding, for simplicity, with the origin of the axes.

To approximate the arc of circumference $P_1 - P'_s$ the interpolating unit is arranged to work substantially in the following manner.

Figure 1:
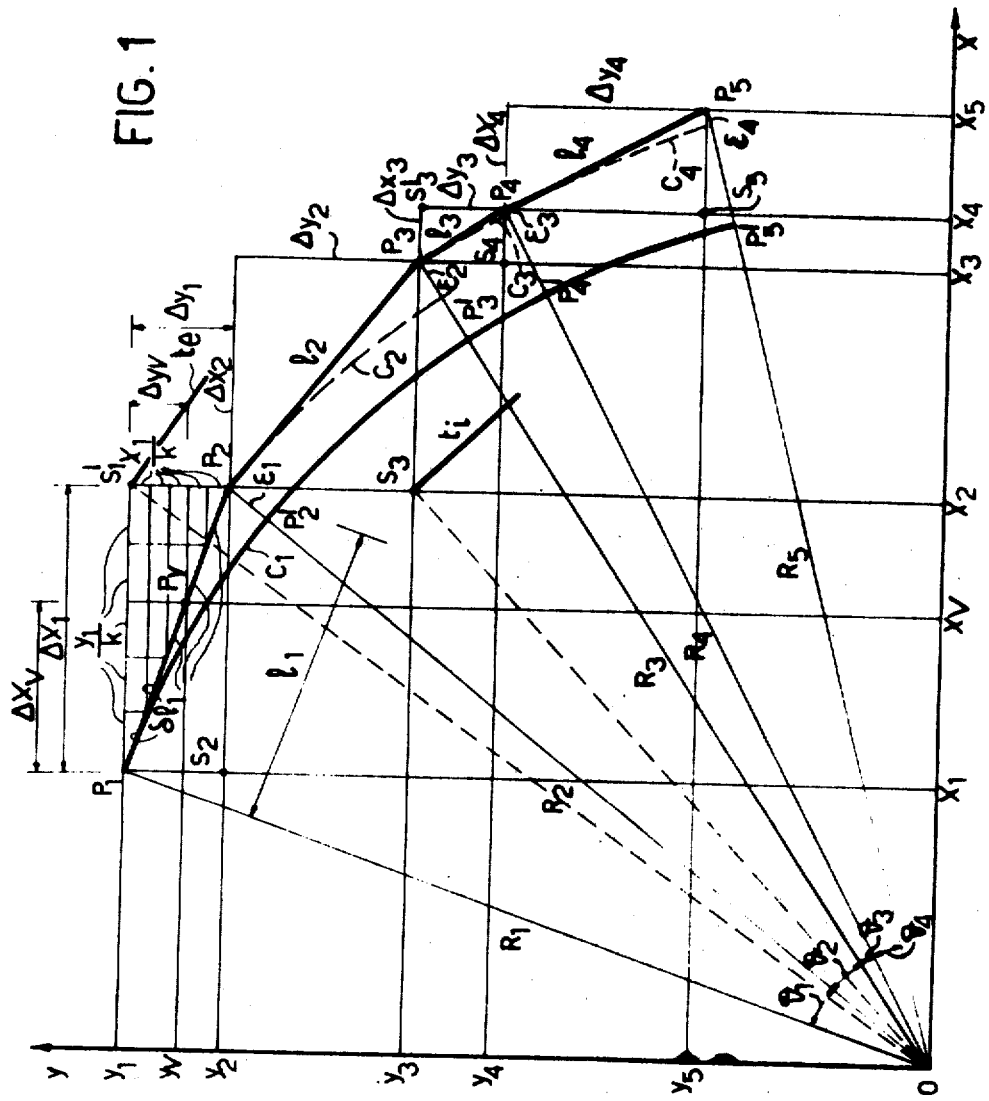
FIG. 1 illustrates the techniques by which there is effected the interpolation of a stretch of circular path comprised in a plane in accordance with the invention.

The movable member is caused to move, in a first interpolation phase, along the tangent to the circle $C_1$ at $P_1$ so as to cover a segment $P_1 - P_2 = l_1$ (FIG. 1). Such a displacement has displacement components $\Delta x_1$ and $\Delta y_1$ on the two axes of amount:

$$\Delta x_1 = x_2 - x_1$$

$$\Delta y_1 = -(y_2 - y_1).$$

The second interpolation phase originates from the point $P_2$ which lies on the circle $C_2$ with center O and gives rise to a displacement $P_2 - P_3 = l_2$ along the tangent at $P_2$ to the aforesaid circle $C_2$, with the displacement components $\Delta x_2$, $\Delta y_2$. Successive phases originate from the points $P_3$, $P_4$ belonging to the circles $C_3$, $C_4$ with center O and give rise to the displacements $P_3 - P_4 = l_3$, $P_4 - P_5 = l_4$ along the tangents at $P_3, P_4$ to the circles $C_3$ and $C_4$, with displacement components $\Delta x_3$, $\Delta y_3$, and $\Delta x_4$, $\Delta y_4$.

By considering $\Delta x_i = x_{i+1} - x_i$, and $\Delta y_i = y_{i+1} - y_i$ as two typical generic components of the displacement, and by marking with the index i the coordinates of a generic point along the arc of the circle $C_1$ to be interpolated, referred to the center O of the circle itself, since the triangles O $P_i x_i$, $P_i$ $P_{i+1}$ $S_{i+1}$, are similar, we have $$\Delta x_i / \Delta y_i = y_i / x_i \quad (1)$$

During each interpolation phase corresponding to a displacement of the movable member $P_i - P_{i+1} = l_i$, such a member is caused to move by means of a series of displacement increments $\delta l_i$ all equal to one another. Whilst a displacement $P_i - P_{i+1}$ has been called an interpolation phase, a displacement increment $\delta l_i$ can be considered as a microphase whose components on the $x$ and $y$ axes in order to be able to satisfy (1) can be represented respectively by:

$$\delta l_{ix} = \frac{\Delta x_i}{n} = \frac{y_i}{K}; \qquad \delta l_{iy} = \frac{\Delta y_i}{n} = \frac{x_i}{K} \qquad (2)$$

where $K$ is a constant factor, chosen in a manner which will be specified later on, and $n$ is the number of the displacement increments comprised in each interpolation phase.

In Figure 1 there have merely been shown, for greater clarity, the displacement increments $\delta l_1$ relating to the first interpolation phase $P_1 - P_2 = l_1$.

The coordinates $x_{i+1}$, $y_{i+1}$ of a point $P_{i+1}$ of the broken line $P_1, P_2, \ldots, P_5$ traced with the techniques formerly indicated, are made up as:

$$x_{i+1} = x_i \pm \sum_0^n \delta l_{ix} = x_i \pm \sum_0^n \frac{y_i}{K}$$

$$y_{i+1} = y_i \pm \sum_0^n \delta l_{iy} = y_i \pm \sum_0^n \frac{x_i}{K} \qquad (3)$$

In the equation (3) before the summations there appears the plus or minus sign. It is evident that such signs depend on the quadrant in which the arc of circle that is to be interpolated is positioned.

The coordinates $x_v$, $y_v$ of a variable point $P_v$ (Figure 1) along a segment $P_i - P_{i+1}$ of the broken line $P_1, P_2, \ldots, P_5$ which approximates the arc of circle, is given by the relations:

$$x_v = x_i \pm \sum_0^v \frac{y_i}{K}$$

$$y_v = y_i \pm \sum_0^v \frac{x_i}{K} \qquad (4)$$

in which the summations are made over $v$ terms where $v < n$. For example in the case of the point $P_v$ shown in Figure 1, the coordinates $x_v$ and $y_v$ calculated by equation (4) are:

$$x_v = x_1 + \sum_0^3 \frac{y_i}{K}$$

$$y_v = y_1 - \sum_0^3 \frac{x_i}{K} \qquad (5)$$

From equation (3) the displacement components $\Delta x_i$, $\Delta y_i$ can be seen to be:

$$\Delta x_i = x_{i+1} - x_i = \pm \sum_0^n \frac{y_i}{K}$$

$$\Delta y_i = y_{i+1} - y_i = \pm \sum_0^n \frac{x_i}{K} \qquad (6)$$

With the interpolation described, at the end of the first interpolation phase, the movable member finds itself at $P_2$ instead of at $P'_2$. The error $\epsilon_1$ resulting from following the tangent to the circle $C_1$ rather than the circle itself is thus:

$$\epsilon_1 = \frac{R_1}{\cos \theta_1} - R_1 = R_1 \left( \frac{1}{\cos \theta_1} - 1 \right) \qquad (7)$$

in which $R_1$ and $\theta_1$ are respectively the radius of the circle $C_1$ and the angle subtended at the vertex 0 by the arc $P_1 - P'_2$.

For a generic interpolation phase originating at the point $P_i$ the error is $$\epsilon_i = R_i \left( \frac{1}{\cos \theta_i} - 1 \right) \qquad (8)$$

$R_i$ being the radius of the circle of centre 0 passing through $P_i$ and $\theta_i$ the angle formed between such radius and the radius $R_{i+1}$.

Equation (8) can be written in a simpler form with some approximation. In fact, by selecting sufficiently small values of the components $\Delta x_i$, $\Delta y_i$ and therefore of $\theta_i$ (in Figure 1 such values have been substantially increased for clarity) it is possible to equate with good approximation $\sin \theta_i$ with $\tan \theta_i$, and taking into account that $l_i = R_i \tan \theta_i$, we have $$\cos \theta_i = \sqrt{1 - \sin^2 \theta_i} \simeq \sqrt{1 - \tan^2 \theta_i} = \sqrt{1 - \frac{l_i^2}{R_i^2}}; \qquad (9)$$

Expanding $1/\cos \theta_i$ gives $$\frac{1}{\cos \theta_i} = \frac{1}{\sqrt{1 - \frac{l_i^2}{R_i^2}}} = 1 + \frac{l_i^2}{2R_i^2} + \text{terms in } \frac{l_i^4}{R_i^4} \qquad (10)$$

Since $l_i$ is small compared to $R_i$, terms after the second can be ignored, and substituting for (10) in (8) gives:

$$\epsilon_i = (l_i^2 / 2R_i) \qquad (11)$$

Assuming now we approximate, in the manner indicated, a complete circle, with a number of interpolation phases executed with equal values of the parameter $\theta_i$, since there are required in such a case with good approximation $2\pi R_i/l_i$ phases, the error $\epsilon_c$ incurred for the interpolation of a complete circle will be:

$$\epsilon_c = (l_i^2 / 2R_i) \cdot (2\pi R_i / l_i) = \pi l_i \qquad (12)$$

Since, as is clearly seen from FIG. 1, $l_i$ is given by:

$$l_i = \sqrt{\Delta x_i^2 + \Delta y_i^2} \qquad (13)$$

on the basis of equations (6), (11) and (12) we obtain:

$$\epsilon_i = \frac{1}{2R_i}(\Delta x_i^2 + \Delta y_i^2) = \frac{1}{2R_i}\left[ \left( \sum_0^n \frac{y_i}{K} \right)^2 + \left( \sum_0^n \frac{x_i}{K} \right)^2 \right] \qquad (14)$$

and $$\epsilon_c = \pi \sqrt{\Delta x_i^2 + \Delta y_i^2} = \pi \sqrt{\left( \sum_0^n \frac{y_i}{K} \right)^2 + \left( \sum_0^n \frac{x_i}{K} \right)^2} \qquad (15)$$

From (15) it can be seen that the interpolation error for interpolating a complete arc of a circle (the same conclusion holds good for the interpolation of a half or a quadrant a circle) is independent of the radius of the circle itself, but depends solely on the values of the displacement components $\Delta x_i$, $\Delta y_i$ which are selected during the interpolation. Taking for example:

$\Delta x_i = \Delta y_i = 1$ micron, $\epsilon_c$ has the value:

$\epsilon_c = 3.14 \times 1.41 \simeq 4.5$ micron. Therefore, to have a small interpolation error $\epsilon_c$ it is sufficient to select small values of $\Delta x_i$ and $\Delta y_i$. In particular, to cause the error $\epsilon_c$ to be less than a predetermined value (for example 4.5 microns) it is sufficient to ensure that the value of the components $\Delta x_i$ and $\Delta y_i$, in each interpolation phase, does not exceed a predetermined value (for example 1 micron).

From equations (14) and (15) it will be observed that the value chosen for $K$ influences the errors $\epsilon_i$ and $\epsilon_c$. In fact, since the summations contain a whole number of predetermined terms $x_i/K$, $y_i/K$, the values of $\epsilon_i$ and $\epsilon_c$ are realized with greater precision with a high value of $K$.

From be 15) it can again b3 observed that to render the error $\epsilon_c$ approximately constant upon varying the radius of the circle $R_i$ to be interpolated, it is necessary to vary the value of $K$ when one passes from one arc of circle to another arc of different radius. In fact, by varying $R_i$ the coordinates $x_i$, $y_i$ of the points from which the interpolation is initiated vary. For example, for circles with large values of the radius $R_i$ there correspond large values of $x_i$ or of $y_i$ as can be seen from FIG. 1. Therefore, on the basis of equation (15), if we wish to obtain a constant error $\epsilon_c$ upon varying $R_i$, for high values of $R_i$ (and hence of $x_i$ or $y_i$) it is necessary to use correspondingly high values of $K$. In general, the value of $K$ has to vary directly with the value of $R_i$ to obtain an approximately constant error $\epsilon_o$.

DESCRIPTION OF THE INTERPOLATING UNIT OF THE APPARATUS OF THE INVENTION

The device of the present invention is provided with an interpolating unit which is able to work on the basis of equations (3), (4), (5) and (6). In these formulas, as has been seen, $x_i$ and $y_i$ represent the displacement components along the $x$ axis and along the $y$ axis and by which there is controlled the displacement of the movable member of the machine, in the manner which will be indicated. Since, upon the basis of equations (14) and of (15) the value both of the error $\epsilon_i$ effected in each interpolation phase and of the error $\epsilon_c$ effected to interpolate the entire circle depend entirely upon the displacement components, to contain such errors below predetermined values, the values of $\Delta x_i$ and $\Delta y_i$ are limited in such a way that the aforesaid values of the errors are not exceeded. To do this, on the basis of the relations (14) and (15) it is necessary to limit appropriately the number of the terms of the summations in the final term of these relations. When in an interpolation phase the value of the error $\epsilon_i$ exceeds that allowed, one passes to a subsequent interpolation phase. That is to say, with reference to the interpolation phases of FIG. 1, supposing for example that we have departed from a point $P_1$ with coordinates $x_1$, $y_1$, and arrived at the point $P_2$ with coordinates $x_2$, $y_2$, and that the error $\epsilon_1$ incurred in the phase $P_1 - P_2$ has reached the maximum value allowed, the interpolating unit then effects a successive interpolation phase taking the point $P_2$ as initial point and causing the movable member to cover the segment $P_2-P_3$ the direction of which is substantially that of the tangent at the point $P_2$ to the circle $C_2$.

If the errors $\epsilon_i$ in each interpolation phase are kept approximately constant it follows that the angle $\theta_1$, $\theta_2$ ... $\theta_n$ relating to each interpolation phase, are not equal, and the segments of the broken line $P_1, P_2 \ldots P_n$ which represent the path which approximates the arc of circle have, in general, a different length.

The control of the error incurred in interpolating an arc of a circle can therefore be effected through the control of the displacement components $\Delta x_i$ and $\Delta y_i$. Since in each interpolation phase $\Delta x_i$ is different from $\Delta y_i$, if we ensure that the greater of the two components does not exceed a predetermined maximum value, the error which is incurred, on the basis of equations (14) and (15), will be less than that which there would be if the components were to be equal and both assumed such a predetermined value. Therefore, the interpolation device of the invention checks both the $\Delta x_i$ and the $\Delta y_i$ components and is arranged to cause an interpolation phase to end in order to pass to a successive phase when either one only of the two components reaches a predetermined value. Such a predetermined value can be any suitable value and can be equal to $C.U$, where $C$ is a constant and $U$ a unit of length. It is deemed appropriate, in the case of the interpolation unit of the embodiment described, for reasons which will be specified later on, to select $C = 1$ and $U = 1$ micron.

Figure 2:
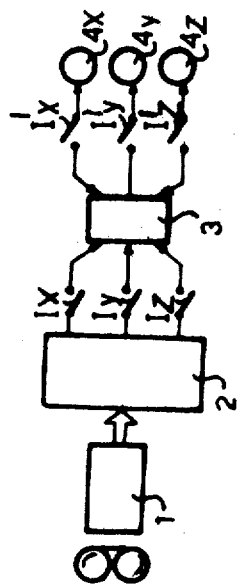
FIG. 2 shows a general block diagram of an apparatus for the continuous numerical control of the positioning of a movable member of a machine tool, in which the device of the present invention is incorporated.

The device can be incorporated into an apparatus for the continuous numerical control of a movable member of the type shown diagrammatically in FIG. 2 and whose general structure is known from the aforementioned Patent. Such an apparatus comprises a program member, for example a tape reader 1, which is connected to feed an interpolation unit 2, which is essentially a digital computer. The interpolation unit 2 feeds, in its turn, a digital to analog converter 3 which controls servo mechanisms $4_x$, $4_y$ and $4_z$ adapted to position the movable member along the axes x, y and z.

The operation of the apparatus comprises a first period in which the program member supplies to the interpolation unit the coordinates of the points of the path and the maximum velocity with which this path has to be covered. There follows a second period in which, the program member 1 remaining inactive, there occurs the interpolation proper, and the interpolation unit 2 is active to control, in real time, the positioning of the movable member.

The servo mechanism $4_x$, $4_y$ and $4_z$ are position servo mechanisms adapted once a position order is received, to bring the movable member to the position indicated. The servo mechanisms therefore receive position orders at a rate dependent on the rate at which the interpolation cycles follow one another.

According to one embodiment of the apparatus of FIG. 2, for each displacement axis of the machine tool there is provided a separate digital to analog converter, whose input is fed by the digital signal processed by the interpolation unit, and whose output supplies an analog control signal to a transducer which controls the movement of the movable member of the machine tool along a corresponding displacement axis.

According to an alternative embodiment of the apparatus of FIG. 2, if it is desired to reduce the number of digital to analog converters necessary, use is made of a single converter for all the displacement axes. In such a case it is necessary to send the information signal to the transducers relating to the various displacement axes in time-division multiplex. In such a technique the axes are cyclically addressed for sending the corresponding signals, and therefore the information signals which relate to one and the same instant of time are shunted to the various axes successively. Thus in FIG. 2, the switches $I_x$, $I_y$, $I_z$ are understood to be closed cyclically for feeding the converter 3 and similarly the switches $I'_x$, $I'_y$ and $I'_z$ are understood to be closed cyclically for feeding the servo motors $4_x$, $4_y$ and $4_z$.

Figure 3:
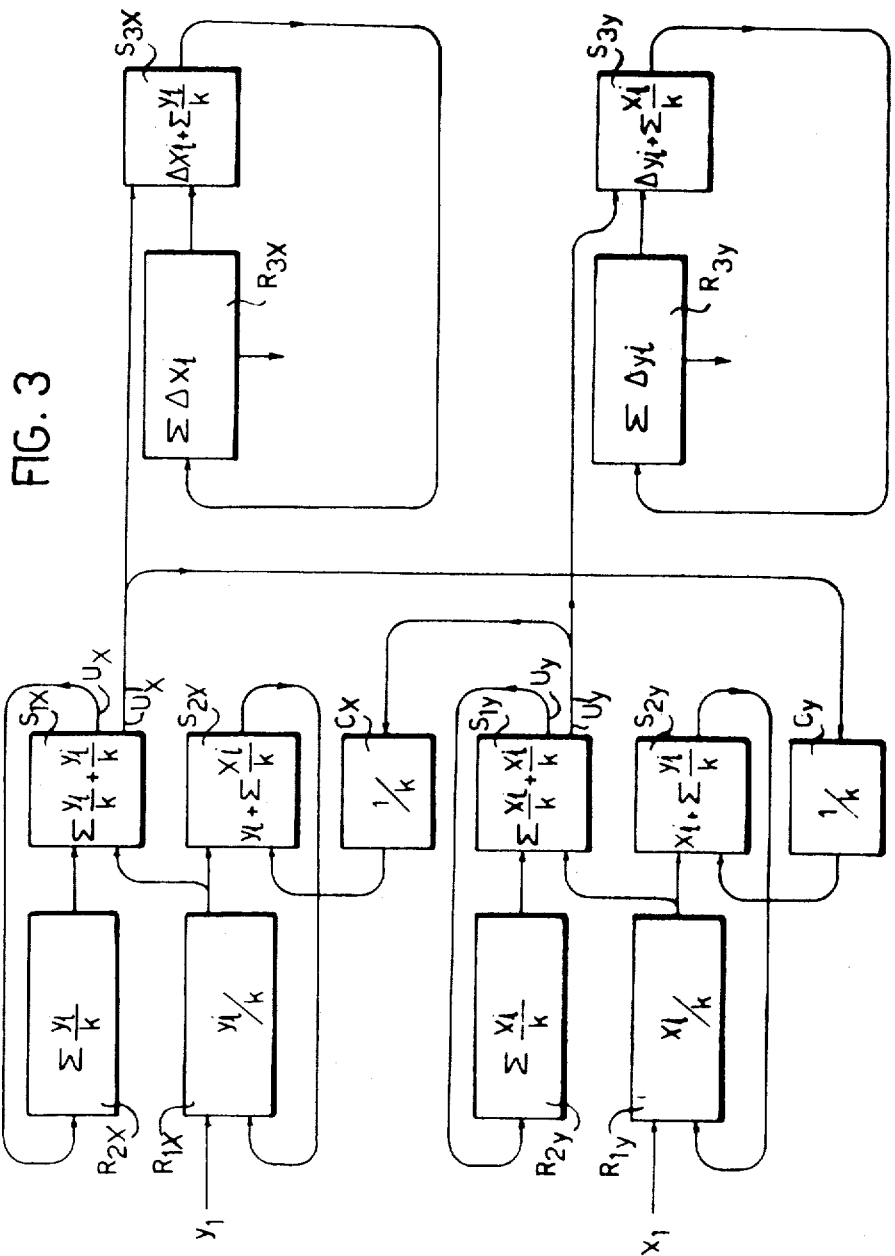
FIG. 3 shows a block diagram of the interpolation unit of the device of the invention which forms part of the apparatus of FIG. 2.

The interpolation unit 2, which forms part of the invention is shown in FIG. 3. Such a unit consists essentially of two similar parts, one for elaborating the data relating to the x axis (the part at the top of FIG. 3) and operating substantially on the basis of the first of equations (3), (4), (5) and (6), and the second for elaborating the data relating to the y axis and operating on the basis of the second of the same equations.

Each part comprises essentially three registers $R_{1x}$, $R_{2x}$, $R_{3x}$ and $R_{1y}$, $R_{2y}$, $R_{3y}$. In the registers $R_{1x}$ and $R_{1y}$, whose inputs are in communication with the program member 1 (FIG. 2), there are fed in respectively the terms $y_i$, $x_i$ of equation (3). In fact such terms are fed into the registers subject to division by $K$, whereby the registers $R_{1x}$, $R_{1y}$ contain the terms $y_i/K$, $x_i/K$. In the registers $R_{2x}$ and $R_{2y}$ there are stored respectively $\Sigma(y_i/K)$ and $\Sigma(x_i/K)$ of the same relation and finally in the registers $R_{3x}$ and $R_{3y}$ there are stored the summations of $\Delta x_i$ and $\Delta y_i$ of equation (6).

Two summators $S_{1x}$ and $S_{1y}$, whose inputs are connected respectively to the registers $R_{1x}$, $R_{2x}$ and $R_{1y}$, $R_{2y}$ are arranged to form the sums of the terms contained in the aforesaid registers as indicated in FIG. 3. The result of the sum is transferred from the outputs $U_x$, $U_y$ of the summators to the corresponding register $R_{2x}$, $R_{2y}$, and from the outputs $U'_x$, $U'_y$ of the same summators to the input of further summators $S_{3x}$, $S_{3y}$.

The summators $S_{1x}$, $S_{1y}$ are adapted to generate at their outputs $U_x$, $U_y$ the summations computed at the end of each interpolation step $\delta l$ or microphase, whatever may be the total value then held in the summators, whilst their outputs $U'_x$, $U'_y$ are only activated when the summations reach a predetermined value. Such predetermined or carry-forward value has been selected in the illustrated example to be equal to 1 micron, whereby at the summators $S_{3x}$, $S_{3y}$ connected to the outputs $U'_x$, $U'_y$ of the summators $S_{1x}$, $S_{1y}$ there arrive successive terms whose value is equal to 1 micron.

The sum emerging from the summators $S_{3x}$, $S_{3y}$ is stored in the registers $R_{3x}$, $R_{3y}$.

Another two summators $S_{2x}$, $S_{2y}$ are arranged to effect the sum of the terms contained respectively in the registers $R_{1x}$, $R_{1y}$ and of the terms coming from counters $C_x$ and $C_y$ connected respectively to the outputs $U'_y$ and $U'_x$ of the summators $S_{1y}$ and $S_{1x}$.

In order for the terms coming from the counters $C_x$ and $C_y$ and added in the summators $S_{2x}$, $S_{2y}$ respectively to the terms $y_i/K$ and $x_i/K$ contained in the registers $R_{1x}$, $R_{1y}$ to be homogeneous with these latter terms, they have to be divided by $K$. Such division can be effected either inside the counters themselves or, preferably, with known techniques, during introduction of the terms into the summators $S_{2x}$, $S_{2y}$. The sum emerging from the summators $S_{2x}$, $S_{2y}$ is applied to the registers $R_{1x}$, $R_{1y}$.

The operation of the interpolation unit described occurs in the following manner.

It is assumed that interpolation of the arc of a circle $P_1 - P'_5$ with center O of FIG. 1 is desired and that the interpolation starts from the point $P_1$, $(x_1\ y_1)$. At the start of the interpolation, there are applied to the registers $R_{1x}$ and $R_{1y}$, from the program member 1 (FIG. 2), respectively, the coordinates $y_1$ and $x_1$, which as they are fed in are divided by $K$. During the first step (or microphase) of the interpolation phase $P_1 - P_2$ (FIG. 1) (corresponding to a displacement $\delta l_1$), such coordinates are transferred from these registers to the summators $S_{1x}$, $S_{1y}$, and from these into the registers $R_{2x}$, $R_{2y}$.

During each successive step of length equal to $\delta l_1$ of this interpolation phase, the summators $S_{1x}$, $S_{1y}$ add to the content of the registers $R_{2x}$, $R_{2y}$ successive terms $y_1/K$, $x_1/K$ obtained from the registers $R_{1x}$, $R_{1y}$, transferring the sum to the registers $R_{2x}$, $R_{2y}$. In these latter registers there are effected therefore the sums of the terms $y_1/K$ and $x_1/K$ relating to the first interpolation phase, which sums at each instant represent respectively the present value $\Delta x_v$ and $\Delta y_v$ of the displacement components.

As can be seen in FIG. 1, with regard to the interpolation phase between $P_1$ and $P_2$, as the summations proceed, $\Delta x_v$ increases more rapidly than $\Delta y_v$ and when $\Delta x_v = \Delta x_1 = 1$ micron, from the output $U'_x$ of the summator $S_{1x}$ there emerges a signal corresponding to the value of one unit (1 micron) which causes an increment by the same unit, through the summator $S_{3x}$, of the register $R_{3x}$ and, through the counter $C_y$ and the summator $S_{2y}$, of the register $R_{1y}$.

Therefore at the end of the first interpolation phase there are present in the registers $R_{1y}$, $R_{1x}$ coordinates $x_i$ and $y_i$, of value respectively $x_2$ and $y_1$, and in the registers $R_{3x}$, $R_{3y}$ there are present summations of the displacement components $\Delta x_i$, $\Delta y_i$ equal to $x_2 - x_1$ and 0.

The second interpolation phase $P_2 - P_3$ takes place in a manner similar to that described, with the difference that in the registers $R_{2x}$ and $R_{2y}$ there has been preserved that part, less than one micron, of the displacement increments $\Delta x_1 = \Sigma(y_1/K)$, $\Delta y_1 = \Sigma(x_1/K)$ previously totalized by the summators $S_{1x}$, $S_{1y}$. In particular, the content totalized by the summator $S_{1y}$ during the second interpolation phase $P_2 = P_3$, is added by the summator itself with the content of the register $R_{2y}$ (equal to $\Delta y_1$) and when such a sum reaches the value of 1 micron the carry-forwards emerging from the output $U'_y$ of the summator $S_{1y}$ increment by one unit the registers $S_{3y}$ and $R_{1x}$. Therefore at the end of the second interpolation phase there are present in the registers $R_{1y}$, $R_{1x}$ coordinates $x_i$, $y_i$ of value $x_2$ and $y_3$, and in the registers $R_{3x}$, $R_{3y}$ there are present summations of the displacement components $\Delta x_i$, $\Delta y_i$ equal to $\Delta x_1$, $\Delta y_1 + \Delta y_2 = 1$ micron.

The third interpolation phase $P_3 - P_4$ takes place like those previously described, an increment of one unit taking place in the registers $S_{3x}$ and $R_{1y}$ when $\Delta x_2 + \Delta x_3 = 1$ micron.

It can therefore be seen that the summators $S_{1x}$, $S_{1y}$, during each interpolation phase, accumulate simply the $x_i/K$, $y_i/K$ whilst the carry-forwards greater than a micron of the operations effected by such summators are sent respectively to the counters $C_y$, $C_x$ and to the summators $S_{3x}$, $S_{3y}$. Furthermore, in each interpolation phase, in order to increment each register $R_{1x}$, $R_{1y}$, $R_{3x}$, $R_{3y}$ they contribute apart from the values of the $y_i/K$, $x_i/K$ totalized in each phase also those totalized in the preceding phase and retained in the registers $R_{2x}$, $R_{2y}$.

In the operation of the interpolating unit proceeding in order to interpolate the arc of circle $P_1 - P_5$ of FIG. 1, it can be seen that at the end of each interpolation phase the coordinates of the points $x_i$, $y_i$ contained in the registers $R_{1y}$, $R_{1x}$ and the summations of the displacement components $\Delta x_i$, $\Delta y_i$ contained in the registers $R_{3x}$, $R_{3y}$ are those given in the following Table.

| interpolation phase | $R_{1y}$ | $R_{1x}$ | content of the registers $R_{3x}$ | $R_{3y}$ |
|---|---|---|---|---|
| $P_1 - P_2$ | $x_1$ | $y_1$ | $\Delta x_1$ | 0 |
| $P_2 - P_3$ | $x_2$ | $y_3$ | $\Delta x_1$ | $\Delta y_1 + \Delta y_2$ |

| | | | | |
|---|---|---|---|---|
| $P_3 - P_4$ | $x_4$ | $y_3$ | $\Delta x_1 + \Delta x_2 + \Delta x_3$ | $\Delta y_1 + \Delta y_2$ |
| $P_4 - P_5$ | $x_4$ | $y_5$ | $\Delta x_1 + \Delta x_2 + \Delta x_3$ | $\Delta y_1 + \Delta y_2 + \Delta y_3 + \Delta y_4$ |

By observing the values held in the registers $R_{1x}$, $R_{1y}$, $R_{3x}$, $R_{3y}$ it can be seen that the coordinates of the final point of the various interpolation phases subsequent to the first do not correspond to those of the points $P_2$, $P_3$, $P_4$, $P_5$ but to those of the points $S'_1$, $S_3$, $S'_3$, $S_5$ respectively. It follows therefore that the interpolation unit described does not work exactly in accordance with equation (3), but in a slightly different manner but not giving rise, as will be specified later on, to error of interpolation whose order of magnitude is greater than that previously calculated with equations (14) and (15).

If it were desired to make the interpolation unit work exactly in accordance with (3) it would be necessary for there to be accumulated in the registers $R_{1x}$, $R_{1y}$, $S_{3x}$, $S_{3y}$, during each interpolation phase, the components $\Delta x_i$, $\Delta y_i$ actually corresponding to that phase, the value of which could be even a fraction of the predetermined unit (a fraction of a micron).

In order to take account of the differences between the theoretical mode of operation corresponding to the strict application of equation (3) and the real one of the interpolating unit, with each interpolation phase ending at the points $S'_1$, $S_3$, $S'_3$, $S_5$, the interpolating unit works in such a way that a subsequent phase originates from each of the aforesaid points. Therefore it can be considered that the second phase $P_2 - P_3$ starts from the point $S'_1$, that is to say that the accumulations which are effected during this phase are calculated in accordance with the direction of the tangent $t_e$ to the circle of center O and radius $OS'_1$. Similarly, it can be considered that the third phase $P_3 - P_4$ starts from the point $S_3$, and that during this phase there are effected accumulations along the direction of the tangent $t_1$ to the circle of center O and radius $OS_3$. The tangents $t_e$ and $t_1$ are obviously divergent and, with good approximation, form the same angle with the direction of the tangent at $P_2$ to the circle $C_2$, the tangent according to whose direction there should have been effected the accumulations in the second phase working strictly in accordance with equation (3).

One can therefore conclude that in each interpolation phase the interpolating unit works in a slightly different manner than the theoretical one foreseen by equation (3). The differences between the two modes of operation depend on the different direction of the tangents along which there are effected the accumulations of the microphases $\delta l_i$ in each phase. Such differences obviously introduce small errors, of an order less than that of the errors $\epsilon_i$ or equation (14) and which are compensated in the subsequent phases.

Another method of taking account of the aforesaid differences consists in a considering that the relations (3) correspond to an interpolation according to the broken line $P_1 - P_2 - P_3 - P_4 - P_5$, whilst the interpolating unit works according to the broken line $P_1 - S'_1 - S_3 - S'_3 - S_5$. The second broken line intersects, at the start and at the end of each phase, the first broken line and constitutes, with good approximation, a compensation line of the same. Therefore, with good approximation, the two final points $P_5$ and $S_5$ of the aforesaid broken lines can be considered as coinciding. In the case illustrated in FIG. 1 the point $S_5$ approximates quite better than the point $P_5$ the circle $C_1$, the distance of the first point from the point $P'_5$ being less than the distance of the second point from the same point $P'_5$.

SPEED CONTROL OF THE DEVICE

Similarly to other numerical control devices, the device of the invention is provided with means for generating cyclically signals at the end of periods of time of predetermined duration $\Delta t$.

Each period of time $\Delta t$ defines a period of time during which it can be assumed that there takes place one complete cycle of operation of the device of the invention. In such a period of time, which is considerably greater than the maximum length of one interpolation phase of the interpolation unit 2 (corresponding to a displacement $P_i - P_{i+1}$ of the broken line of FIG. 1), there normally takes place several interpolation phases of such a unit and in the registers $R_{3x}$, $R_{3y}$ (FIG. 3) there are accumulated the sum of the displacement components $\Delta x_i$, $\Delta y_i$ relating to these phases.

The values of the summations of the displacement components $\Sigma \Delta x_i$, $\Sigma \Delta y_i$, accumulated in such registers, can be used, in known manner, at the end of each of the cycles to control the displacement of the movable member. In this case, at the end of each of the said cycles of duration $\Delta t$ there could be transferred to the digital to analog converter 3 (FIG. 2) all the accumulations of the displacement components $\Delta x_i$, $\Delta y_i$ which the interpolating unit 2 has totalized in the same period $\Delta t$. Before applying the summations $\Sigma \Delta x_i$ and $\Sigma \Delta y_i$ to the converter 3 it would be necessary to add to these either the coordinates, $x_1$ and $y_1$ respectively, of the point $P_1$ with regard to the origin O of the axes $x$, $y$, or the corresponding coordinates of such an origin with regard to another fixed system of axes.

By working in this way the summations of $\Delta x_i$, $\Delta y_i$ which the interpolation unit 2 has managed to accumulate in the registers $R_{3x}$, $R_{3y}$ in the period of time $\Delta t$, and the value of which obviously depends on the speed with which the unit itself works, give rise to corresponding displacements of the movable member along the path, which occur with the maximum speed $v$. In fact the speed of displacement $v$ of the movable member, in each cycle, is, with good approximation, equal to the relation between the displacement of the member itself along the path in the time $\Delta t$, and such time. Since $\Delta t$ is constant, such a speed turns out to be proportional to the displacement which the movable member effects during a cycle. The maximum value of such a displacement is that corresponding to the displacement totalized in the time $\Delta t$ by the interpolation unit (displacement characterized by the terms $\Sigma \Delta x_i$ and $\Sigma \Delta y_i$), whereby, if such a displacement is also that which is permitted to the movable member in the time $\Delta t$, the maximum speed of the member is realized.

If on the other hand it is desired to obtain displacements of the movable member at a controlled speed and, in particular, if it is desired to cause the displacement of the movable member in each of the cycles of duration $\Delta t$ to occur at a speed not greater than a speed which is predetermined and programmed in the program member 1 (FIG. 2) of the device, one can proceed as is indicated in U.S. Pat. No. 3,518,513 and as is expounded in brief hereinunder.

If in the time $\Delta t$ there are transmitted from the interpolating unit to the movable member displacement components such as to realize a certain displacement $\Delta s$ of the member along the path, its speed during a cycle is equal to $v = \Delta s/\Delta t$. Therefore the control of the speed can be effected by controlling simply the displacement $\Delta s$ of the movable member along the path during each cycle.

Since the speed of the movable member has components $v_x$, $v_y$ along the two axes $x$, $y$, which are related to each other, it follows that to ensure that the speed $v$ does not exceed the aforesaid predetermined value it is sufficient to ensure that neither of the two components $v_x$, $v_y$ exceeds a predetermined value. To do this, it is sufficient to ensure that the two components of the displacement $\Delta s$ along the two axes $\Delta s_x$, $\Delta s_y$, respectively do not exceed a predetermined maximum value, indicated hereinafter by $\Delta s_x M$ and $\Delta s_y M$. The maximum speed in each cycle can therefore be programmed by fixing the values of $\Delta s_x M$ and $\Delta s_y M$ and is achieved when either one of the components $\Delta s_x$, $\Delta s_y$ of the displacement $\Delta s$ of the movable member equals $\Delta s_x M$ or $\Delta s_y M$. It is noted that, for the purposes of the limitation of the speed during each cycle, the displacement $\Delta s$ is measured in the direction of the speed $v$ of the point of the path from which the cycle itself originates.

For the purposes of the application of the concepts expounded in the above Patent to the device of the invention, it is sufficient to keep in mind that, the values of $\Delta s_x M$ and $\Delta s_y M$ being determined, the achievement of the maximum speed is obtained when one of the two components of the movable member, which displacement is presumed to be effected in the direction of the tangent to the circle to be interpolated which passes through the point from which the interpolation cycle originates, equals $\Delta s_x M$ or $\Delta s_y M$.

Figure 4:
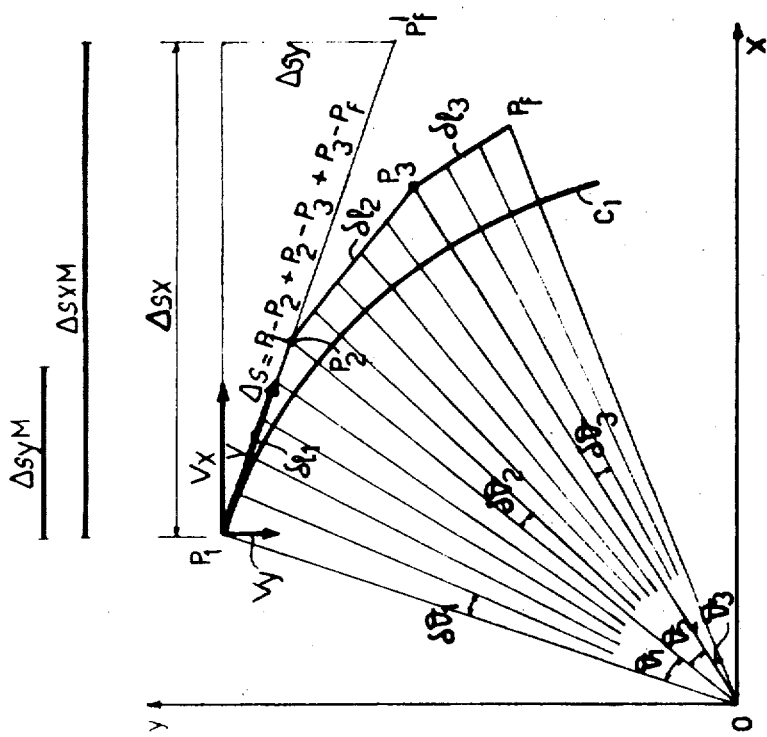
FIG. 4 shows, diagrammatically, the technique by which there is controlled the maximum velocity of the movable member along the trajectory, in accordance with the present invention.

In FIG. 4 there has been shown an interpolation cycle originating at $P_1$ and terminating at a point $P_f$ and comprising three interpolation phases. In this Figure there have been indicated segments of length equal to $\Delta s_x M$ and $\Delta s_y M$ whose values have been presumed to be calculated by the techniques expounded in the above Patent. The displacement $\Delta s$ of the movable member sufficient to achieve the maximum speed is equal to the sum of the segments $P_1 - P_2$, $P_2 - P_3$, $P_3 - P_f$. With $P_1 - R'_f = \Delta s$ there has been indicated a segment which is the sum of the aforesaid segments and having the direction of the tangent at $P_1$ to the circle $C_1$ to be interpolated. The maximum speed, achieved at $P_f$, occurs when one of the projections $\Delta s_x$, $\Delta s_y$ of such segment on the axes $x$ or $y$ reaches the value of $\Delta s_x M$ or $\Delta s_y M$. In the Figure it has been assumed that the value of $\Delta s_x M$ has been reached.

In accordance with the present invention, for calculating the components $\Delta s_x$, $\Delta s_y$ of $\Delta s$ one proceeds in the following manner.

With good approximation it can be assumed that the microphase displacement increments $\delta l_i$ (FIG. 4) which cover the segments $P_i - P_{i+1}$ referring to the various interpolation phases are all equal. In fact, passing from the first interpolation phase to the subsequent one the $y_i/K$ diminish (in the case of FIG. 4) but the $x_i/K$ increase and, therefore one can suppose that $\delta l_i$, which is the hypotenuse of a right-angled triangle whose sides are $x_i/K$ and $y_i/K$, remains constant and that the various increments $\delta l_i$ are arcs subtending equal angles $\delta \theta_i$.

If therefore the various steps $\delta l_i$ of FIG. 4 are all the same and equal to $\delta l_1$, both the sum of the segments $P_1 - P_2$, $P_2 - P_3$, $P_3 - P_f$, and the segment $P_1 - P'_f = \Delta s$ are equal to the same summation $\Sigma \delta l_i$ of displacement increments $\delta l_i$. Since the projections of $\delta l_1$ on the axes $x$ and $y$ are respectively $y_1/K$ and $x_1/K$, the projections on the axes $x$ and $y$ of the summation $\Sigma \delta l_i$ are therefore $\Sigma(y_i/AeK)$ and $\Sigma(x_i/K)$.

It follows that, in the case of the interpolation cycle of FIG. 4, the achievement of the maximum speed takes place when one of the following two equalities is reached:

$$\Delta s_x M = \Sigma(y_i/K) \quad \Delta s_y M = \Sigma(x_1/K \qquad (16)$$

And, in general, for a generic cycle which originates from a point with coordinates $x_i$, $y_i$, such a condition is realized when:

$$\Delta s_x M = \Sigma(y_i/K) \quad \Delta s_y M = \Sigma(x_i/K) \qquad (17)$$

The device of the invention is provided with a unit adapted to work on the basis of equation (17), for generating a signal in corresponding with the achieving of one of the aforesaid equalities.

Figure 5:
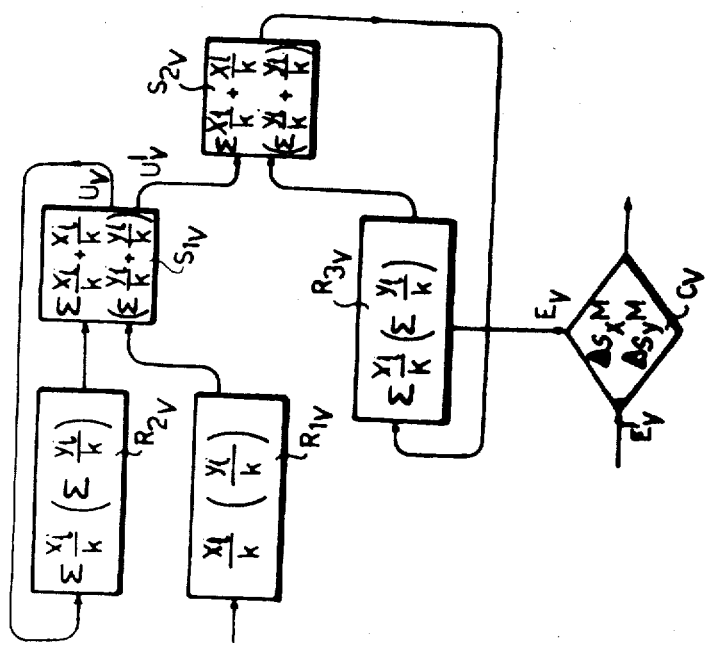
FIG. 5 shows a block diagram of a unit for controlling the maximum velocity of the movable member, which unit is incorporated in the apparatus of FIG. 2 and works according to the diagram of FIG. 4.

Such a unit is shown in FIG. 5 and comprises three registers $R_{1v}$, $R_{2v}$ and $R_{3v}$. The outputs of the first two registers are connected to the inputs of a summator $S_{1v}$, one of whose outputs $U'_v$ is connected to the input of another summator $S_{2v}$ and the other, $U_v$, to the input of the register $R_{2v}$.

The input of the register $R_{1v}$ is connected to the output of one of the registers $R_{1x}$ or $R_{1y}$ of one of the two groups of the interpolation unit of FIG. 2.

The output of the summator $S_{2v}$ is connected to the input of the register $R_{3v}$, whose output is connected in turn to one of the inputs of the summator $S_{2v}$. Another output of the register $R_{3v}$ goes to the input $E_v$ of a comparator $C_v$ connected to the program member 1 (FIG. 2) of the device, from which there is applied to another input $E'_v$ of the comparator the components of displacement $\Delta s_x M$ or $\Delta s_y M$.

The unit described operates in the following manner.

Into the register $R_{1v}$ there is fed, at the start of each interpolation cycle, the value of $x_i/K$ or of $y_i/K$. By working in a manner similar to that described with reference to the complex of the registers $R_{1x}$, $R_{2x}$ and of the summator $S_{1x}$ (or to the complex of the registers $R_{1y}$, $R_{2y}$ and of the summator $S_{1y}$) of the interpolation unit of FIG. 2, at each step of each interpolation phase, in the register $R_{3v}$ there are accumulated $x_i/K$ or $y_i/K$.

By using an arrangement already adopted for the summators $S_{1x}$ or $S_{1y}$ of FIG. 2, from the output $U'_v$ of the summator $S_{1v}$ there emerge solely the carry-forwards of the $\Sigma(x_i/K)$ (or of the $\Sigma y_i/K$) of a value greater than 1 micron, and therefore in the register $R_{3v}$ there is effected the accumulation of such carry-forwards. When the value of $\Sigma x_i/K$ (or of $\Sigma y_i/K$) of such register, applied to the comparator $C_v$, satisfies one of the relations (17), the comparator generates a signal which stops the interpolation cycle. At this point the components $\Sigma \Delta x_i$, $\Sigma \Delta y_i$ contained in the registers $R_{3x}$, $R_{3y}$ of the interpolating unit of FIG. 2 are transferred to the converter 3 for controlling the displacement of the movable member of the machine, with a speed which is equal to the programmed speed.

For the calculation of the components $\Delta s_x M$ and $\Delta s_y M$ there is necessary the knowledge of the components $v_x$ and $v_y$ of the speed $v$ of the points from which each interpolation cycle originates. Such a calculation can be effected, on the basis of the present invention, in the following manner.

Figure 6:
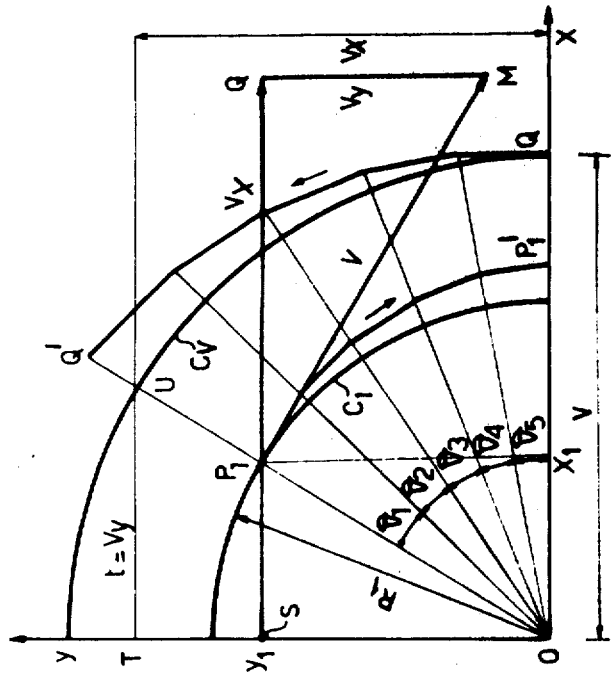
FIG. 6 shows, diagrammatically, the techniques by means of which there are obtained two axial components of the tangential speed of a point which moves on an arc of the circle of the path.

With reference to FIG. 6 let is be supposed, for example, that one wishes to determine the component $v_y$ of the speed $v$ of the point $P_1$. One indicates with $C_1$ the circle with center O and radius $R_1$ along which the movable member moves and with $C_v$ a fictitious circle concentric with the circle $C_1$ with radius equal to the speed $v$ of the point $P_1$. From the similarity of the triangles CTU, $OSP_1$, $P_1QM$ and with the symbols of the Figure one has: $t/v = x_1/R_1 = v_y/v$, from which it can be seen that the segment $t$ is equal to $v_y$.

In order to be able to have $v_y$ immediately available it is therefore simply necessary to effect, once the coordinates $x_1$, $y_1$ of the point $P_1$ are known, two circular interpolations of the type described, by means of one of which one passes from the point $P_1$ to the point $P'_1$ on the axis $x$ and by means of the second of which one passes from the point Q on the circle $C_v$ to the point $Q'$ on that radius of the circle which passes through $P_1$.

An entirely similar reasoning holds goods for the determination of the component $v_x$ of the speed $v$, which has already been shown in FIG. 6.

From FIG. 6 is can be noted that, if with the two aforesaid interpolations, one beginning at $P_1$ and the other beginning at Q, it is desired to reach the final points $P'_1$ and $Q'$ respectively at the same instant, it is necessary that the number of the interpolation phases by the same and that therefore the angle $\theta_i$ relating to corresponding phases of the two interpolations be the same.

Figure 7:
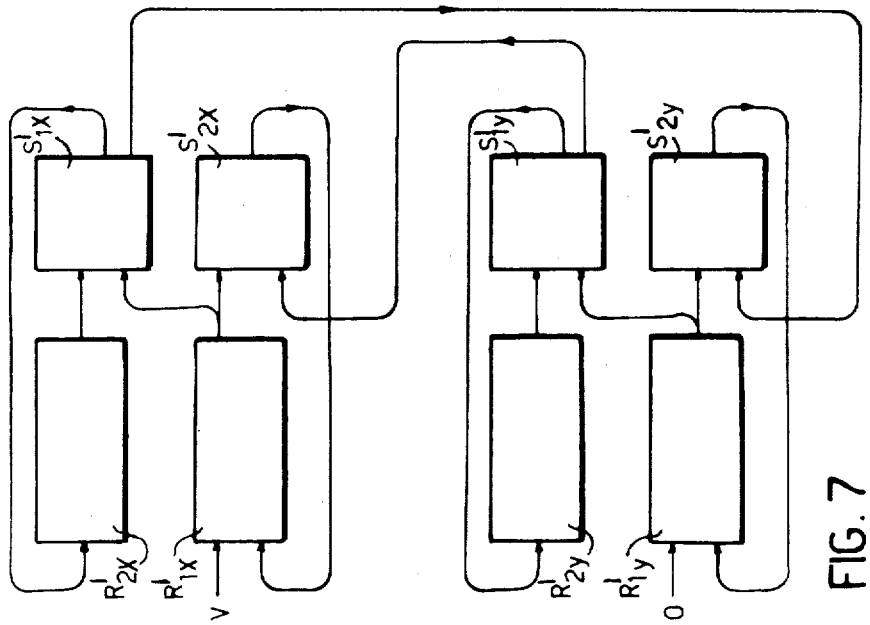
FIG. 7 shows a block diagram of a unit which works in the basis of the previous Figure for obtaining the aforesaid components and which is incorporated in the apparatus of FIG. 2.
Figure 7:
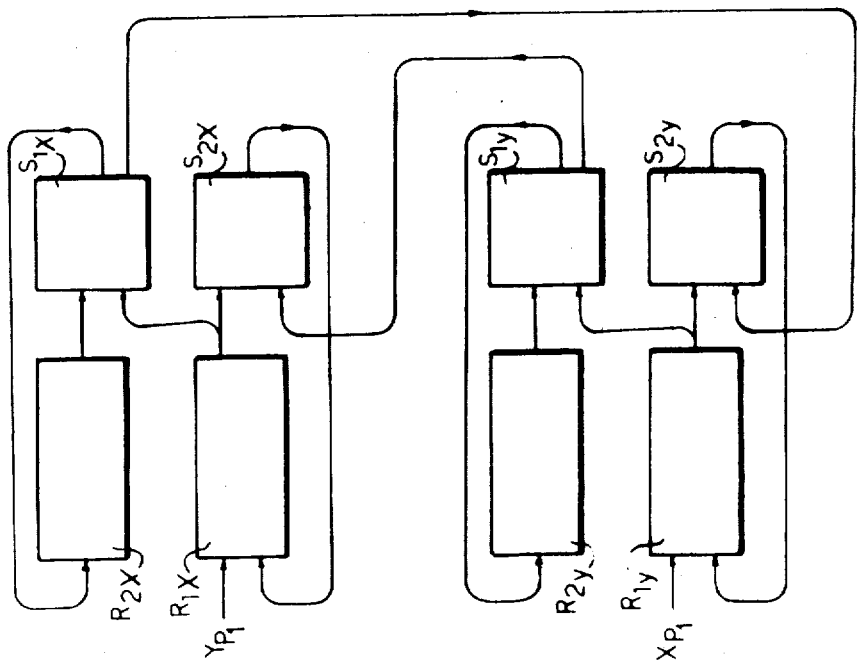

To determine the components $v_x$ and $v_y$ of the speed the device of the invention comprises a unit shown in FIG. 7 comprising two groups, each of which is substantially the same as the interpolating unit shown in FIG. 2 and is arranged to effect the interpolation of one of the circles $C_1$ and $C_v$ of FIG. 6.

The components of each of such groups, which are identical to corresponding components of the interpolation unit of FIG. 2, are marked with the same references as used in FIG. 2, (without index the components of the group to the left of FIG. 7 and with the index those of the group to the right). The detailed operation of each of such groups is not described, it being entirely similar to that of the interpolating unit of FIG. 2. Into the registers $R_{1x}$, $R_{1y}$ there are introduced the coordinates $x_{P1}$, $y_{P1}$ of the point $P_1$ (FIG. 6), whilst into the registers $R'_{1x}$, $R'_{1y}$ there are introduced the coordinates $v$ and O of the points Q (FIG. 6).

Furthermore, the structure of each of the groups is slightly simplified with regard to that of the unit of FIG. 2, the summators $S_{3x}$, $S_{3y}$ the registers $R_{3x}$, $R_{3y}$ and the counters $C_x$, $C_y$ being omitted. Such a simplification is possible since in this case, unlike what occurred for the interpolation unit of FIG. 2, it is not necessary to determine $\Sigma \Delta x_i$, $\Sigma \Delta y_i$ nor is it necessary to divide by $K$ the terms coming from the summators $S_{1y}$, $S'_{1y}$ before adding them in the summators $S_{2x}$, $S'_{2x}$.

This latter simplification derives from the fact that in each interpolation phase the angle $\theta_i$ has to be the same, both for the circle $C_1$, and for the circle $C_v$. To obtain this, the terms which have to be accumulated in the registers $R_{1x}$, $R_{1y}$, $R'_{1x}$, $R'_{1y}$ have to be the same "weight" and therefore have to be introduced in a fixed relation in the summators $S_{2x}$, $S_{2t}$, $S'_{2x}$, $S'_{2y}$.

It is clear that modifications and variations can be made to the described embodiment of the present invention, without departing from the scope of the invention itself.

What is claimed is:

1. In a position control device for the continuous positioning of a member movable along at least two axes in accordance with discontinuous position orders which define axes of a circle belonging to the path which is to be followed, an interpolation unit operative through a succession of interpolation phases each of said phases being employed to compute a path segment which is tangential to one of said axis of a circle, said interpolation unit comprising:

an input for receiving each coordinate $(x_i, y_i)$ of the point from which each interpolation phase originates;

first means connected to said input to divide each coordinate input by a predetermined factor $K$ to generate relations $(x_i/K, y_i/K)$ representing incremental displacement components referred to the respective axes $(y, x)$ along each of said segments of said path;

second means connected to said first means to form during each interpolation phase summations $(\Sigma x_i/K, \Sigma y_i/K)$ of each of said incremental displacement components, said summations including the same number of terms and representing the components $(\Delta y_i, \Delta x_i)$ referred to said axes $(y, x)$ of each of said segments of said path; and third means connected to said second means to form the sum of said path segment components $(\Delta y_i, \Delta x_i)$ over said successive interpolation phases.

2. The combination as claimed in claim 1, wherein said interpolation unit further comprises means for stopping the formation of said summations $(\Sigma(x_i/K), \Sigma(y_i/AK))$ of said incremental displacement componen and for ending the interpolation phase and initiating the calculation of summations of new incremental displacements $(\Sigma(x_i + 1)/K, \Sigma(y_i + 1)/K)$ to initiate a subsequent interpolation phase, such increments being obtained by dividing by $K$ the coordinates $x_{i+1}$, $y_{i+1}$ of a point of one of said path segments defined by the relations:

$$x_{i+1} = x_i + \Delta x_i$$
$$y_i + 1 = y_i + \Delta y_i$$

when one of the summations $(\Sigma(x_i/K), \Sigma(y_i/K))$ of incremental displacement components reaches a predetermined value.

3. The combination as claimed in claim 2, wherein said second means operates in a subsequent interpolation phase by adding to the summations of the incremental displacement components for the preceding phase in the event that said incremental displacement components did not reach said predetermined value in said preceding phase.

4. The combination as claimed in claim 2, wherein said predetermined value is selected so as to make the error incurred in the interpolation of a complete circle and given by the relation:

$$\epsilon_c = \pi \sqrt{(\Sigma(x_i/K))^2 + (\Sigma(y_i/K))^2}$$

less than a predetermined amount.

5. The combination as claimed in claim 4, wherein said predetermined value is equal to a unit selected in a metric system of measurement.

6. The combination as claimed in claim 5, wherein said unit is equal to 1 micron.

7. The combination as claimed in claim 1, wherein said first means is adapted to operate with a factor $K$ whose value can be selected from a plurality of values, high values being selected for interpolating arcs of circles of high radius and small values for interpolating arcs of circles of small radius.

8. The combination as claimed in claim 1, wherein said second means comprises, for each displacement axis $(x, y)$, a first summator, a first register for said summations and a second register for the coordinates of the points from which each interpolation phase originates, said coordinates being introduced into said second register by dividing them by $K$ and said first summator operating so as to add, in successive periods of time, to the content of said first register an incremental displacement component $(x_i/K, y_i/K)$ obtained from said second register.

9. The combination as claimed in claim 8, wherein for each displacement axis $(x, y)$, there is a second summator operative to add, during each of said periods of time, to the content of said second register the sum generated by said first summator relative to the other coordinate axis.

10. The combination as claimed in claim 8, wherein said third means comprises for each displacement axis, a third summator and a third register, said third summator totalizing the summations computed by said first summator during successive interpolation phases for incrementing said third register.

11. The combination as claimed in claim 10, wherein each of said first summators is provided with a pair of outputs, to a first one of which there is applied the actual sum generated by said first summator and to the second of which there is applied the sum generated by said first summator only when said sum is equal to or greater than said unit, said first output of each of said first summators being connected to said associated first register said second output of each of said first summators being connected to said second and third associated summators.

12. The combination as claimed in claim 1, wherein the interpolation is effected in a series of interpolation cycles of constant duration ($\Delta t$) each comprising several interpolation phases, comprising fourth means operative to calculate during each of said cycles the summations ($\Sigma(x_i/K)$, $\Sigma(y_i/K)$) of said incremental displacement components, and to compare said summations with maximum displacement components ($\Delta s_x M$, $\Delta s_x M$) to stop said interpolation unit when either:

$$\Delta s_x M = \Sigma(y_i/K) \text{ or } \Delta s_y M = \Sigma(x_i/K)$$

whereby the speed of said member does not exceed a predetermined speed.

13. The combination as claimed in claim 12, wherein said fourth means comprises a first summator, a first register for said summations and a second register connected to receive said incremental displacement components, said first summator being operative to add, in successive periods of time, to the content of said first register an incremental displacement component ($x_i/K$, $y_i/K$) obtained from said second register, one output of said summator being arranged to generate the sum computed by said summator only when said sum is equal to or greater than a predetermined unit.

14. The combination as claimed in claim 13, wherein said fourth means comprises a second summator connected to said output of said first summator and to a third register arranged to receive the sum computed by said second summator.

15. The combination as claimed in claim 14, wherein said third register is connected to a comparator to another input of which there are applied the maxim displacement components ($\Delta s_x M$, $\Delta s_y M$).

16. The combination as claimed in claim 1, including means operative to calculate the components ($v_x$, $v_y$) of the speed $v$ of each point from which an interpolation cycle starts, comprising further means for effecting, simultaneously, two circular interpolations, a first relating to an arc of a circle of said path and the second relating to an arc of a circle concentric with said preceding circle and with a radius equal to the speed of a point on said path, said further means being operative to cause said first interpolation to start from a point on said circle of said path and to cause it to end at a point on one of the displacement axes $(x, y)$ and to cause said second interpolation to start from a point on said displacement axis $(x, y)$ and to cause it to end at a point on the radius which passes through said point on the circle of the path, the components $v_x$, $v_y$ of the speed of said point of the circle of the speed corresponding to the coordinates of the final point of said second interpolation.

17. The combination as claimed in claim 16, wherein said further means is arranged to effect said two interpolations with the same number of interpolation phases and in the same period of time.

18. The combination as claimed in claim 16, wherein said interpolation unit includes registers for storing said incremental displacement component values, and said further means comprises two parts each of which is the same as said interpolation unit, having registers corresponding to said registers of said interpolation unit, and means operative to apply to said registers of one of said parts of said further means the coordinates of said point on said circle of the path and to said registers of the other of said parts coordinates consisting of said speed and zero $(v, 0)$.

* * * * *